(12) United States Patent
Munkberg et al.

(10) Patent No.: US 9,569,878 B2
(45) Date of Patent: Feb. 14, 2017

(54) SAMPLE CULLING BASED ON LINEARIZED 5D EDGE EQUATIONS

(75) Inventors: Carl J. Munkberg, Malmo (SE); Franz P. Clarberg, Lund (SE)

(73) Assignee: Intel Corporation, Santa Clara, CA (US)

( * ) Notice: Subject to any disclaimer, the term of this patent is extended or adjusted under 35 U.S.C. 154(b) by 528 days.

(21) Appl. No.: 13/993,729

(22) PCT Filed: Dec. 7, 2011

(86) PCT No.: PCT/US2011/063837
§ 371 (c)(1),
(2), (4) Date: Jun. 13, 2013

(87) PCT Pub. No.: WO2013/085514
PCT Pub. Date: Jun. 13, 2013

(65) Prior Publication Data
US 2013/0265301 A1    Oct. 10, 2013

(51) Int. Cl.
*G06T 15/00* (2011.01)
*G06T 15/40* (2011.01)
(52) U.S. Cl.
CPC .............. *G06T 15/00* (2013.01); *G06T 15/005* (2013.01); *G06T 15/40* (2013.01)
(58) Field of Classification Search
None
See application file for complete search history.

(56) References Cited

U.S. PATENT DOCUMENTS

| 5,914,753 | A  | 6/1999  | Donovan |
| 7,917,342 | B2 | 3/2011  | Miura |
| 2004/0179600 | A1 | 9/2004 | Wells |
| 2007/0239779 | A1 | 10/2007 | Hugill |
| 2009/0322881 | A1 | 12/2009 | Shu et al. |

FOREIGN PATENT DOCUMENTS

| CN | 1695151 | 11/2005 |
| JP | 10-307809 | 11/1998 |
| JP | 2007221581 | 8/2007 |
| JP | 2010307809 | 11/2010 |
| TW | 200803521 | 1/2008 |
| TW | 201120812 | 6/2011 |
| TW | 201120812 A1 | 6/2011 |

OTHER PUBLICATIONS

Google Translate—"Development Graphical User Interface and Automatic Mesh for Finite Element Method" Chiou, Jun. 2004.*
PCT International Search Report and Written Opinion issued in corresponding PCT/US2011/063837 dated Aug. 17, 2012 (8 pages).

(Continued)

*Primary Examiner* — Michelle Chin
(74) *Attorney, Agent, or Firm* — Trop Pruner & Hu, P.C.

(57) ABSTRACT

Thin invention introduces a five-dimensional rasterization technique that uses a test based on triangle edges in order to obtain high efficiency. A compact formulation of five-dimensional edge equations is used to derive a conservative triangle edge versus tile test in five dimensions, expressed as an affine hyperplane.

31 Claims, 2 Drawing Sheets

(56) References Cited

OTHER PUBLICATIONS

Taiwan Search Report in corresponding Taiwan patent application No. 101146086 dated Aug. 11, 2014 [with English translation] (2 pages).
Official Letter in corresponding Taiwan patent application No. 101146086 dated Aug. 18, 2014 [with English translation]; (8 pages).
Chiou, Yan-Cheng, "Development of Graphical User Interface and Automatic Mesh for Finite Element Method," (a master's thesis from Dept. of Mechanical Engineering of National Cheng Kang University, Jun. 1, 2005 (71 pages).
TW Search report issued by TIPO in corresponding application No. 101135907 dated Feb. 22, 2016 (4 pages).
China Patent Office issued 1st Office Action in corresponding CN application No. 201180075355.1 dated Nov. 12, 2015 (16 pages).
China Patent Office issued 2nd Office Action in corresponding CN application No. 201180075355.1 dated May 3, 2016 (3 pages).
China Patent Office issued 3rd Office Action in corresponding CN application No. 201180075355.1 dated Oct. 24, 2016 (3 pages).

\* cited by examiner

SAMPLE CULLING BASED ON LINEARIZED 5D EDGE EQUATIONS

BACKGROUND

This relates to graphics processing and particularly to the graphical depiction of motion blur and depth of field.

Motion blur is an important visual effect that reduces temporal aliasing and makes moving content appear smoother. However, efficient rendering of motion blur in real-time three-dimensional graphics is nontrivial. In stochastic rasterization of motion blur, moving geometric primitives are sampled in both space and time, using a large set of samples to obtain high-quality motion-blurred images with low noise levels. For each of the sample positions, an inside test is executed to determine whether the moving primitive covers the sample. This overlap test in x, y and t space is generally more expensive than an inside test in traditional rasterizers.

Depth of field is an effect stemming from the finite aperture of a real camera, and makes out-of-focus objects appear blurry. In stochastic rasterization of depth of field, geometric primitives are sampled in both space and over the camera lens.

A stochastic rasterizer that supports simultaneous motion blur and depth of field executes visibility tests for each triangle in a five dimensional (5D) domain (x,y,u,v,t). This domain consists of spatial positions (x,y), lens coordinates (u,v) and time t. These visibility tests are computationally much more expensive than a single visibility test in standard 2D rasterization. Additionally, for each triangle, many (e.g. 16-64) such tests are executed per pixel to obtain images with low noise levels.

BRIEF DESCRIPTION OF THE DRAWINGS

Some embodiments are described with respect to the following figures.

DETAILED DESCRIPTION

Figure 1:
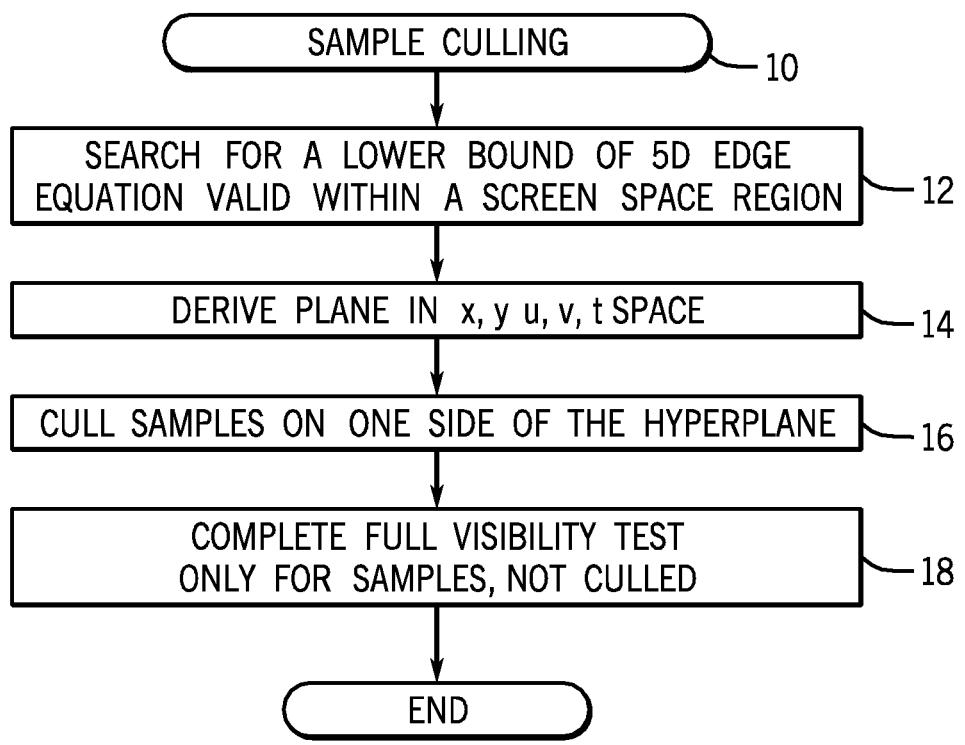
FIG. 1 is a flow chart for one embodiment.

A five-dimensional rasterization technique includes a tile test based on triangle edges. With this test, many visibility tests can be avoided, increasing the rasterization efficiency with some embodiments. A compact formulation of five-dimensional edge equations is used to derive a conservative triangle edge versus tile test in five dimensions.

A 5D edge equation from a triangle with linear vertex motion and depth of field can be written as:

$$e(x,y,u,v,t) = (n(t) + m(t) \times (u, k\, u, 0)) \cdot (x, y, 1) \quad (1)(1)$$

where n(t) and m(t) are quadratic vectors in t and all computations are performed in 2D homogeneous (2DH) coordinates, with a vertex defined as $p = (p_x, p_y, p_w)$. The derivation follows below.

We assume linear vertex motion in world space, so that a vertex moves according to $p(t) = (1-t)q + t\, r$. Depth of field is a shear in clip-space, parameterized on the lens coordinates (u,v), and can be seen as applying the vector $c(t)(u, k\, v, 0)$ to the vertex position. The function $c(t) = (1-t)c^0 + t\, c^1$ is the clip space circle of confusion for vertex p, and k>0 is a scalar coefficient correcting for non-square aspect ratios. Note that c(t) is signed circle of confusion and may be negative.
The clip space vertex position with defocus and motion blur is then given by:

$$p'(t) = p(t) + c(t)(u, k\, v, 0).$$

The normal of a 5D edge equation in 2DH is defined by:

$$p'_0(u,v,t) \times p'_1(u,v,t) = (p_0(t) + c_0(t)(u,k,v,0)) \times (p_1(t) + c_1(u,kv,0)) = $$
$$p_0(t) \times p_1(t) + (c_1(t)p_0(t) - c_0(t)p_1(t)) \times (u,kv,0)$$

The first term $p_0(t) \times p_1(t)$ can be expressed as:

$$p_0(t) \times p_1(t) = (at^2 + bt + c) = n(t)$$

This is the time-dependent edge equation from motion blur rasterization.

If we introduce $m(t) = c_1(t)p_0(t) - c_0(t)p_1(t)$ which is quadratic in t, we can write the edge equation as $e(x,y,u,v,t) = (n(t) + m(t) \times (u, k\, v, 0)) \cdot (x, y, 1)$. For the purpose of this description, we define e>0 as outside the edge, i.e., samples that can be culled.

We search for a lower bound of the 5D edge equation, expressed as an affine hyperplane P: $a \cdot x = 0$ in xyuvt space, where $x = (1, x, y, u, v, t)$, valid within a screen space tile R: $[x_{min}, x_{max}] \times [y_{min}, y_{max}]$, so that $e(x,y,u,v,t) \geq a \cdot x$ for all samples within the screen space tile. The tile R can be a smaller axis-aligned region in screen space, or even the entire bounding box of the moving and defocused triangle.

We recompute the hyperplane approximation for each tile, and use the plane to cull samples within the valid xyuvt domain. A tile can be culled if the hypercube of valid samples is entirely outside the hyperplane. More precisely, pick the corner c of the hypercube farthest in the negative direction of the hyperplane normal. If $a \cdot c > 0$, the tile can be safely culled. Testing a point in xyuvt space against a hyperplane amounts to five multiply-add operations (which can be executed in fixed-point arithmetic). This can be done both at the tile and sample level.

In one embodiment, the algorithm hierarchically culls samples in screen space tiles R of different size. The computations and result from a coarse level in the hierarchy may be reused as a starting point for the computations performed at tiles at finer levels.

In one embodiment, to avoid computing $o = a_{const} + a_x c_x + a_y c_y$ per sample, o can be computed conservatively per tile and may be reused at the sample level. Testing an individual uvt sample against the hyperplane then cost three multiply-add operations (which can be executed in fixed-point arithmetic), but gives lower culling rates compared to evaluating the full hyperplane.

We can also refine the bounds for each component x,y,u, v,t using the hyperplane. In general:

$$a \cdot x > 0 \Leftrightarrow x_k > -\frac{1}{a_k} \sum_{i \neq k} a_i x_i,$$

which gives bounds for each coordinate axis. For example, if we want to refine the temporal bounds, we use the hypercube corner c from above, and we get an inequality on the form $$t > -\frac{1}{a_t}(a_{const} + a_x c_x + a_y c_y + a_u c_u + a_v c_v)$$

for each triangle edge. The sum to the right can be reused from the trivial reject test above, and the additional cost is a division per edge per tile.

To obtain the hyperplane approximation, in one embodiment we compute a lower linear bound of the $n(t)\cdot(x,y,1)$ and $(m(t)\times(u,kv,0))\cdot(x,y,1)$ terms individually. These bounds are recomputed per screen space tile R. The complete approximation results in a hyperplane in xyuvt space. All samples outside this plane can be rejected. The plane is a valid culling plane for all samples within a screen space tile.

The first term of the 5D equation: $n(t)\cdot(x,y,1)$ is linearized using a known technique from motion blur rasterization [Munkberg et al., "Hierarchical Stochastic Motion Blur Rasterization", HPG 2011] such that $$e_n = n(t)\cdot(x,y,1) > o\cdot(x,y,1) + yt. \quad (2)$$

To bound $e_m = (m(t)\times(u,kv,0)^T)\cdot(x,y,1) = d\cdot(u,kv,0)$, we first bound each component of $m(t)$ and express $d=(x,y,1)\times m(t)$ as a vector of intervals $\hat{d}=(\hat{d}_x,\hat{d}_y,\cdot)$. A lower bound of $e_m$ can be written as $$e_m > \min(\hat{d}_x u + \hat{d}_y k\, v) > \alpha u + \beta v + \zeta, \quad (3)$$

for all (u, v) within the valid region of the lens. This is a lower bound for $e_m$, and is conservative for all times and sample positions within the tile R.

To derive the $\alpha$, $\beta$, $\zeta$ coefficients, we evaluate $\min(\hat{d}_x u + \hat{d}_y kv)$ at the four corners of the lens and choose coefficients $\alpha, \beta, \zeta$ such that Equation 3 holds. In one embodiment, a coarse set of coefficients are given by $\alpha = \text{avg}(\hat{d}_x), \beta = k\,\text{avg}(\hat{d}_y)$ and $\zeta = 0.5(|\hat{d}_x| + k|\hat{d}_y|)$, where $\text{avg}(\hat{x}) = 0.5(\overline{x} + \underline{x})$ and $|\hat{x}| = \overline{x} - \underline{x}$. Other implementations are possible, exploiting the fact that the u and v are in the range [−1,1].

Intuitively, for a triangle in focus, $|m(t)|$ is small, and the edge function is only slightly perturbed when moving over the lens.

In one embodiment $m(t)$ may be bounded by expressing it as a quadratic Bezier function:

$$m(t) = (1-t)^2 b_0 + 2(1-t)t b_1 + t^2 b_2,$$

where:

$$b_0 = c_1^0 q_0 - c_0^0 q_1,$$
$$b_1 = \frac{1}{2}(c_1^1 r_0 + c_1^0 q_0 - c_0^0 r_1 - c_0^1 q_1),$$
$$b_2 = c_1^1 r_0 - c_0^1 r_1.$$

The convex hull property lets us bound $m(t)$ by simply computing an axis aligned bounding box (AABB) containing $b_0, b_1$ and $b_2$. This bounding computation can be done once per triangle edge in the triangle setup. If we have bounds on t, the Bernstein expansion can be reparameterized (using de Casteljau subdivisions) for tighter bounds.

Combining Equation 2 and 3, we have shown that for $(x,y)\in R$, $(u,v)\in\Omega$ and $t\in[0,1]$, $e(x,y,u,v,t) = e_n + e_m > a\cdot x$, where $x = (1,x,y,u,v,t)$ and $a = (\zeta + o_z, o_x, o_y, \alpha, \beta, \gamma)$.

Culling using the hyperplanes can be selectively enabled by estimating the culling potential for each edge.

We can derive a more accurate approximation for the temporal bounds compared to first finding a hyperplane and then intersecting the hyperplane against the xyuvt cube. The new approximation expresses the edge equation as a quadratic scalar function in t, using bounds for u,v,x and y.

The second term of the 5D edge equation can be written as:

$$\phi(u,v,t) = m(t)\cdot((u,kv,0)\times(x,y,1)).$$

For a certain screen space tile, we define the interval vector $$\hat{s} = (\hat{u}, k\hat{v}, 0)\times(\hat{x}, \hat{y}, 1) = (k\hat{v}, -\hat{u}, \hat{u}\hat{y} - k\hat{v}\hat{x}),$$

where $\hat{x}$ and $\hat{y}$ denote the tile extents for a screen space tile R and $(\hat{u}, \hat{v})\subseteq[-1,1]\times[-1,1]$ represent the valid lens region. Furthermore, let $m(t) = ft^2 + gt + h$. Now introduce:

$$\hat{\phi}(t) = (f\cdot\hat{s})t^2 + (g\cdot\hat{s})t + (h\cdot\hat{s}) = \hat{\alpha}_m t^2 + \hat{\beta}_m t + \hat{\gamma}_m.$$

Note that $\hat{\phi}(t)$ is a scalar function in t, where each of the coefficients is an interval that depends on the screen space extents, the valid lens region, and the coefficients for the $m(t)$ vector.

Similarly, we can derive a scalar function bounding $n(t)\cdot(x,y,1)$ over the screen space tile:

$$\phi(u,v,t) = n(t)\cdot(x,y,1)$$

$$\hat{\phi}(t) = \hat{\alpha}_n t^2 + \hat{\beta}_n t + \hat{\gamma}_n.$$

We add the bounds $\hat{\phi}(t)$ and $\hat{\phi}(t)$ together so that we express the entire edge equation as a quadratic function in t as:

$$\hat{\psi}(t) = \hat{\phi}(t) + \hat{\phi}(t).$$

We search for solutions to $\psi(u,v,t)=0$, and follow the same approach as in previous work for tile overlap test using edge equations for motion blur. We derive a lower linear bound $\psi(t) = at + b$, that is conservative for all $(u,v)\in[-1,1]\times[-1,1]$ and for all (x,y) within the active screen space tile. Using this lower bounds, we solve for t, where $\psi(t)=0$.

Note that f, g and h can be computed in the triangle setup, and the added cost per-tile is to derive $\hat{s}$, $f\cdot\hat{s}$, $g\cdot\hat{s}$ and $f\cdot\hat{s}$ per tile. The computation of $\psi(t) = \hat{\phi}(t) + \hat{\phi}(t)$ is a few added instructions, as $\hat{\phi}(t)$ and the lower linear bound are already part of the hyperplane bounding setup.

This alternative approximation may be preferable in case of large motion blur and only slight depth of field. In cases where depth of field is the dominating effect, the first test is more efficient.

In contrast to previous methods, our test extracts a correlation between u, v and t by linearizing the 5D edge equation. Instead of extracting bounds on the form of intervals in each of u, v and t individually (which gives an axis-aligned box in uvt space), our bounds are formulated as an affine hyperplane per triangle edge in the general case.

In the case of modest motion and defocus, the linearization is very efficient, and removes a large set of potential sampling points.

Referring to FIG. 1, a sequence for sample culling 10, may be implemented in software, firmware and/or hardware. In software and firmware embodiments it may be implemented by computer executed instructions stored in a non-transitory computer readable medium such as a semiconductor, magnetic or optical storage. For example the sequence may be integral with a graphics processor or may be stored in a memory associated with the graphics processor such as a system memory to mention two examples.

The sequence 10, according to one embodiment, begins by searching for a lower bound of the five dimensional edge equation, valid within a screen region, as indicated in block 12. Then a plane in xyuvt is derived as indicated in block 14. Next, samples on one side of the hyperplane are culled as indicated in block 16. A complete or full visibility test is only done for samples that are not culled, as indicated in block 18.

Figure 2:
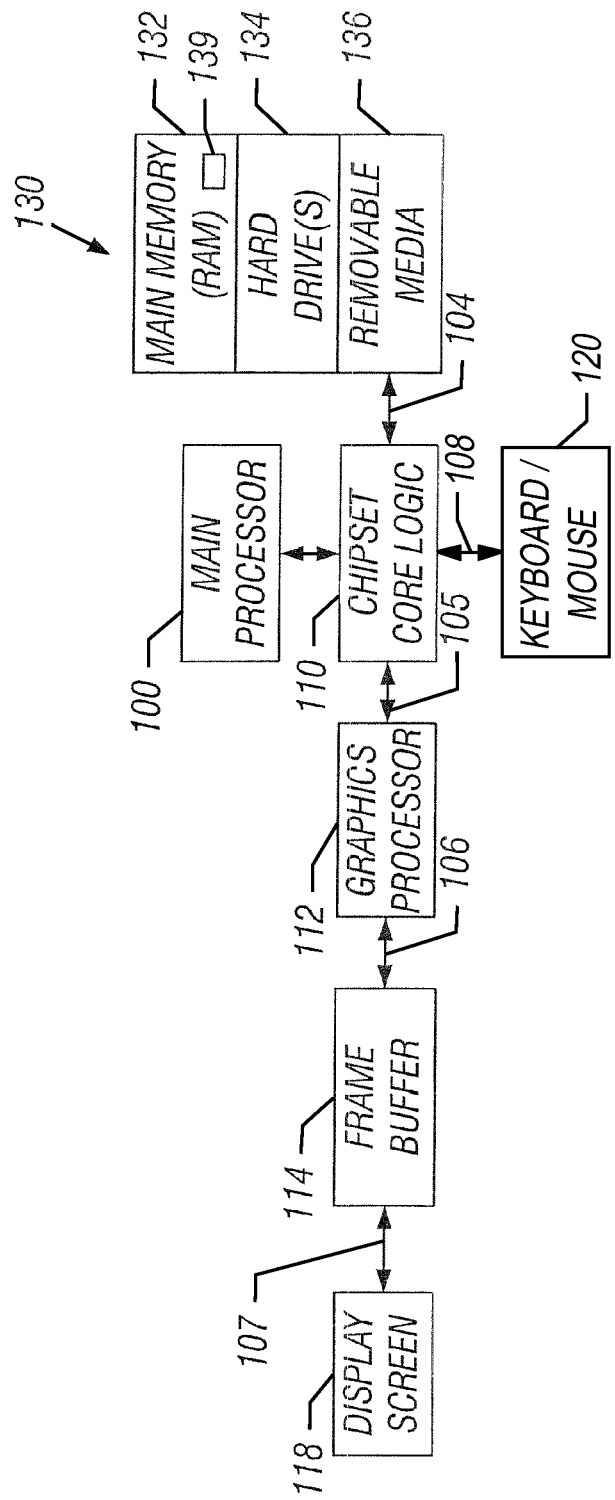
FIG. 2 is a schematic depiction for one embodiment.

The computer system 130, shown in FIG. 2, may include a hard drive 134 and a removable medium 136, coupled by a bus 104 to a chipset core logic 110. A keyboard and mouse 120, or other conventional components, may be coupled to the chipset core logic via bus 108. The core logic may couple to the graphics processor 112, via a bus 105, and the main or host processor 100 in one embodiment. The graphics processor 112 may also be coupled by a bus 106 to a frame buffer 114. The frame buffer 114 may be coupled by a bus 107 to a display screen 118. In one embodiment, a graphics processor 112 may be a multi-threaded, multi-core parallel processor using single instruction multiple data (SIMD) architecture.

In the case of a software implementation, the pertinent code may be stored in any suitable semiconductor, magnetic, or optical memory, including the main memory 132 or any available memory within the graphics processor. Thus, in one embodiment, the code to perform the sequences of FIG. 1 may be stored in a non-transitory machine or computer readable medium, such as the memory 132 or the graphics processor 112, and may be executed by the processor 100 or the graphics processor 112 in one embodiment.

FIG. 1 is a flow chart. In some embodiments, the sequences depicted in this flow chart may be implemented in hardware, software, or firmware. In a software embodiment, a non-transitory computer readable medium, such as a semiconductor memory, a magnetic memory, or an optical memory may be used to store instructions and may be executed by a processor to implement the sequences shown in FIG. 1.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
using a processor to generate an affine hyperplane approximation for a tile to cull samples;
using a processor to cull a tile if a hypercube of valid samples is entirely outside the hyperplane; and
using a processor to pick a corner of the hypercube farthest from the negative direction of the hyperplane normal.

2. The method of claim 1 including formulating bounds as a hyperplane per primitive edge.

3. The method of claim 2 including reducing to an affine hyperplane in uvxyt space where u and v are lens coordinates, t is time, x and y are screen space spatial coordinates.

4. The method of claim 3 including using said affine hyperplane bounds to bound the individual ranges of x, y, u, v, t for each primitive edge.

5. The method of claim 2 including splitting the five dimensional space into two half spaces using said hyperplane and cull all samples falling in one of the halfspaces.

6. The method of claim 5 including recomputing the said hyperplane for each screen space tile.

7. The method of claim 6 including culling samples by evaluating a lower bound of the hyperplane within a screen space tile.

8. The method of claim 7 including evaluating the hyperplane for a more coarse screen space tile, and reusing at a finer screen space tile to cull samples.

9. The method of claim 8 including completing a full visibility test only for samples that are not culled.

10. The method of claim 1 including using bounds based on triangle edges as a triangle undergoes both depth of field and motion blur.

11. The method of claim 1 including detecting a bounding function for a screen space tile, testing samples within the tile against the bounding function and culling samples outside the bounding function.

12. A non-transitory computer readable medium storing instructions executed by a graphics processor to:
generate an affine hyperplane approximation for a tile to cull samples;
cull a tile if a hypercube of valid samples is entirely outside the hyperplane; and
pick a corner of the hypercube farthest from the negative direction of the hyperplane normal.

13. The medium of claim 12 further storing instructions to formulate bounds as a hyperplane per primitive edge.

14. The medium of claim 13 further storing instructions to reduce to an affine hyperplane in uvxyt space where u and v are lens coordinates, t is time, x and y are screen space spatial coordinates.

15. The medium of claim 14 further storing instructions to use said affine hyperplane bounds to bound the individual ranges of x, y, u, v, t for each primitive edge.

16. The medium of claim 13 further storing instructions to split the five dimensional space into two half spaces using said hyperplane and cull all samples falling in one of the halfspaces.

17. The medium of claim 16 further storing instructions to recompute said hyperplane for each screen space tile.

18. The medium of claim 17 further storing instructions to cull samples by evaluating a lower bound of the hyperplane within a screen space region.

19. The medium of claim 17 further storing instructions to complete a full visibility test only for samples that are not culled.

20. The medium of claim 12 further storing instructions to use bounds based on triangle edges as a triangle undergoes both depth of field and motion blur.

21. The medium of claim 12 further storing instructions to detect a bounding function for a screen space tile, test samples within the tile against the bounding function and cull samples outside the bounding function.

22. An apparatus comprising:
a graphics processor to generate an affine hyperplane approximation for a tile to cull samples, cull a tile if a hypercube of valid samples is entirely outside the hyperplane, pick a corner of the hypercube farthest from the negative direction of the hyperplane normal; and a storage coupled to said processor.

23. The apparatus of claim 22, said processor to formulate bounds as a hyperplane per primitive edge.

24. The apparatus of claim 23, said processor to split the five dimensional space into two half spaces using said hyperplane and cull all samples falling in one of the half-spaces.

25. The apparatus of claim 23, said processor to reduce to an affine hyperplane in uvxyt space where u and v are lens coordinates, t is time, x and y are screen space spatial coordinates.

26. The apparatus of claim 25, said processor to recompute said hyperplane for each screen space tile.

27. The apparatus of claim 25, said processor to use said affine hyperplane bounds to bound the individual ranges of x, y, u, v, t for each primitive edge.

28. The apparatus of claim 27, said processor to cull samples by evaluating a lower bound of the hyperplane within a screen space region.

29. The apparatus of claim 22, said processor to use bounds based on triangle edges as a triangle undergoes both depth of field and motion blur.

30. The apparatus of claim 29, said processor to detect a bounding function for a screen space tile, test samples within the tile against the bounding function and cull samples outside the bounding function.

31. The apparatus of claim 30, said processor to complete a full visibility test only for samples that are not culled.

\* \* \* \* \*